United States Patent [19]

Reich et al.

[11] Patent Number: 4,729,242
[45] Date of Patent: Mar. 8, 1988

[54] CONDUCTION-RESPONSIVE METER HEAD

[75] Inventors: Günter Reich, Cologne; Rudolf Flosbach, Thier-Wipperfürth, both of Fed. Rep. of Germany

[73] Assignee: Leybold Heraeus GmbH, Cologne, Fed. Rep. of Germany

[21] Appl. No.: 866,056

[22] Filed: May 21, 1986

[30] Foreign Application Priority Data

May 22, 1985 [DE] Fed. Rep. of Germany ....... 3518388

[51] Int. Cl.⁴ .............................................. G01L 21/12
[52] U.S. Cl. ........................................ 73/755; 73/714; 374/143
[58] Field of Search ................. 73/755, 753, 754, 714, 73/717-728, 733, 734, 735, 745, 746; 374/143

[56] References Cited

U.S. PATENT DOCUMENTS

| 4,369,661 | 1/1983 | Gibb | 73/755 |
| 4,492,123 | 1/1985 | Reich | 73/755 |

FOREIGN PATENT DOCUMENTS

| 1360171 | 7/1971 | U.S.S.R. | 73/755 |
| 1762595 | 9/1974 | U.S.S.R. | 73/755 |

Primary Examiner—Donald O. Woodiel
Attorney, Agent, or Firm—Felfe & Lynch

[57] ABSTRACT

A conduction-responsive meter head has a device having electrical conduction responsive to a condition such as pressure to be metered. The device communicates with the condition to provide its electrical-conduction response to a bridge electrically including the device. A power supply has two terminals on the meter head for providing electrical power to the bridge. The measurement signal from the bridge is provided, however, to a third terminal by a lead from the bridge.

7 Claims, 7 Drawing Figures

CONDUCTION-RESPONSIVE METER HEAD

BACKGROUND OF THE INVENTION

The invention relates to a head operative by conduction response for a meter such as a vacuum gauge, gas thermal-conductivity detector or other such apparatus.

A meter head operative by thermal conduction has a measurement device having thermally-dependent electrical conduction arranged for thermal communication with the material to be metered and electrical conduction in one arm of a bridge circuit, and other electronic components, as appropriate. Two terminals on the meter head are for connecting the meter head to a power supply disposed externally thereof.

The assignee's German patent publication OS No. 31 30 817 and corresponding U.S. Pat. No. 4,492,123 disclose such a thermal-conduction vacuum gauge having a meter head and a separate control unit. The control unit houses a meter and a power supply. The meter head houses a device having thermally-dependent electrical conduction in thermal communication with the vacuum to be gauged and electrically connected into a measuring bridge, as well as other electronic components, including a voltage regulator and an amplifier for processing the bridge-measured values. The meter head and control unit are connected by a two-conductor cable of any desired length. Bothe the power and the measuring current are transmitted through this single cable for improved accuracy.

When plural vacuum gauges of this type are installed in a single plant, however, a disadvantage develops from the common transmission of the measuring current and power supply on the single, two-conductor cable because this requires a separate power supply for each meter head. This is also true of such a vacuum gauge having multiple measurement devices in a single meter head, whether the measurement devices are wire coils with temperature-related resistances, thermocouples, or the like. All-in-all, therefore, the greater the number of vacuum gauges needed in an installation, the greater the cost of the power supplies required.

SUMMARY OF THE INVENTION

An object of the invention is, therefore, to reduce the cost of the power supply for plural conduction-response meters.

This object is achieved, according to the invention, with a meter head of the type described above, but having a separate, third terminal for a line for carrying the measuring signal which is in the form of an impressed current to a display unit separate from the meter head, the other two terminals then serving only for power supply lines. One or more conduction-responsive vacuum gauges or other such meters can then be connected to a single power supply.

As a rule, the power supply is also required for the electrical controls intermediate amplifiers, or the like. For this and for safety, low voltages are used; the voltage most commonly used is 24 volts ±10% DC or AC.

If the electronic components in the meter head are designed so that the total current flowing through the meter head is no more than 100 milliamperes and, preferably, from about 12 to about 80 milliamperes and the measurement current flowing through the third terminal is no more than 60 milliamperes and, preferably, from about 4 to about 40 milliamperes, it is possible, advantageously, to operate with a display unit load of relatively-low impedance, approximately 500 Ohms, for example. This is especially desirable for apparatus connected to the output (e.g., an amplifier), because it makes available a measurement signal having sufficient energy or power.

BRIEF DESCRIPTION OF THE DRAWINGS

Additional advantages and details of the invention will be given with the aid of merely-preferred embodiments which illustrate, but do not limit the invention and are represented in the accompanying drawings, wherein.

DESCRIPTION OF THE PREFERRED EMBODIMENTS

Figure 1:
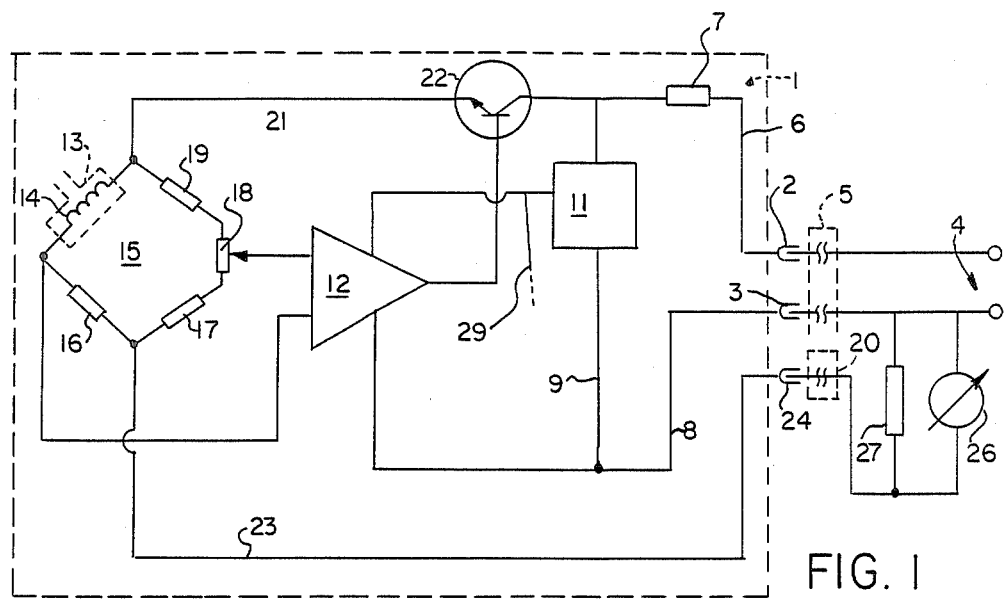
FIG. 1 is a schematic of one preferred embodiment, a meter head, together with a portion of a control unit therefor.

Schematic FIG. 1 shows a meter head at 1 according to the invention arranged and connected for a controlled Parani vacuum gauge. It has two terminals 2, 3. A two-conductor cable outside the meter head at 1 connects the terminals 2, 3 of the meter head at 1 to a power supply shown partially at 4. The power supply supplies a voltage to the terminals 2, 3 of, for example 5 to 50 volts and, preferably 24 volts (±10%) through the two-conductor cable 5 which has a length suitable for the application.

Within the meter head at 1, leads 6 (with resistor 7 series connected therein) and leads 8, 9 connect a voltage regulator 11 across the terminal 2, 3. The voltage regulator 11 supplies a steady voltage to an amplifier 12.

A meter tube 13 is also within the meter head at 1. The interior of the meter tube 13 is connected to a vessel (not shown) in which the pressure is to be measured and, perhaps, controlled thereby. Inside the meter tube 13 is a meter wire 14 having thermally-dependent electrical conduction. It is electrically connected with other resistors 16, 17, 18 and 19 into a Wheatstone bridge 15. Resistor 18 is a balancing resistor, the function of which is described below with reference to FIG. 2.

For the controlled Pirani vacuum guage of FIG. 1, the amplifier 12 and a transistor 22 controlled thereby are connected by lead 21 to apply to the bridge 15 a voltage which always balances the bridge. For this, inputs to the amplifier 12 are connected to diagonally opposite points of the bridge 15 and lead 21 and an additional lead 23 are connected to the other two, diagonally opposite points of the bridge 15.

Lead 23 is connected to a third terminal 24 on the meter head 1. An additional cable 20 is connected to terminal 24 and leads to a display unit 26 disposed outside the meter head at 1. In the embodiment of FIG. 1, the display unit is a voltmeter which measures the voltage across a resistor 27. The display unit 26 and resistor 27 are connected in parallel between the cable 20 and one pole on one conductor of cable 5 to the power supply shown partially at 4. In this embodiment, the power supply is a DC voltage source. The cables 5 and 20 can be combined into a single, three-conductor cable, if desired.

When the vacuum gauge of FIG. 1 is in use, the only current that blows through the lead 23 is a measurement signal. The measurement signal is, therefore, carried out of the meter head at 1 through terminal 24 and connected cable 20 for display on the voltmeter display unit 26 as determined by the load resistor 27.

It is desirable for the electronic components present in the meter head to be of such size that the total current flowing through the meter head amounts to from about 12 to about 80 milliamperes of which from about 4 to about 40 milliamperes is the measuring current in the separate measurement-signal lead 23. At these current levels, with a supply voltage of 24 volts, it is possible to operate with a load (resistor 27) of approximately 500 Ohms at 20 milliamperes. The measurement signal then has sufficient power because the displayed voltage will be of the order of from about 2 to about 10 volts.

FIGS. 2 to 5 each show leads 23', 23'', 23''' and 23'''', in a meter head like lead 23 of FIG. 1, but in which various additional components have been inserted.

Figure 2:
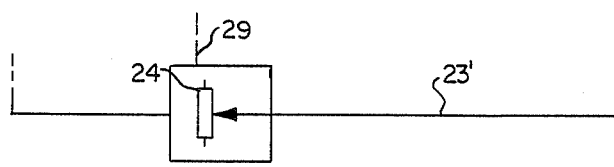
FIG. 2 is a schematic of a portion of another preferred embodiment.

In the embodiment according to FIG. 2, a balancing resistor 24 is in series in the lead 23'. The balancing of the meter head by the balancing resistor (18 in bridge 15 in FIG. 1) and 24 is the performed as follows:

With atmospheric pressure in the meter tube 13 (FIG. 1), first the balancing resistor (18 in FIG. 1) is adjusted such that the maximum measuring current flows in leas 23'. Then, the resistor 24 is adjusted at a zero magnitude of measurement such that a current corresponding to the zero point flows in the lead 23'.

Figure 3:
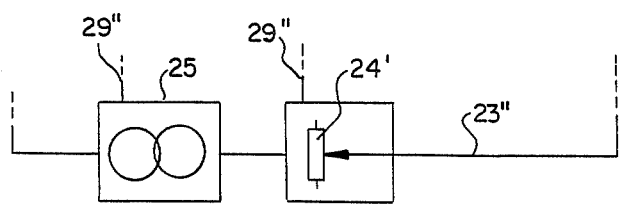
FIG. 3 is a schematic of the same portion as shown in FIG. 2 of still another preferred embodiment.

FIG. 3 shows an embodiment in which a current transformer 25 is series inserted into line 23'' in addition to a balancing resistor 24'. This is desirable when the measurement signal current in line 23'' is to be varied. Such variation can match the measurement signal current in line 23'' to various display units (26 in FIG. 1). The important advantage of this is the exchangeability of the meter head.

Figure 4:
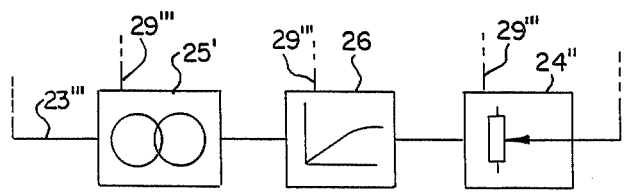
FIG. 4 is a schematic of the same portion as shown in FIG. 2 of still another preferred embodiment.
Figure 5:
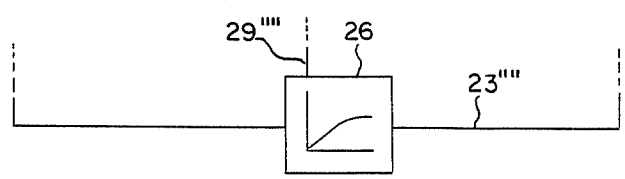
FIG. 5 is a schematic of the same portion as shown in FIG. 2 of still another preferred embodiment.

In the embodiments shown in FIGS. 4 and 5, an amplifier 26 (FIG. 4), 26' (FIG. 5) which varies the measurement-signal current in leads 23''' (FIG. 4), 23'''' (FIG. 5) in a characteristic way is series inserted additionally (FIG. 4) or alone into the measurement-signal lead 23''', 23''''. This is desirable to provide a logarithmic or linearized measurement signal, for example. Furthermore, the ranges of the readings of display units (like 26 in FIG. 1) can be varied in this manner. If all of devices 24'', 25' and 26 are in line 23''' as in FIG. 4, the additional advantage is obtained of being able to produce measurement signals in all desired or standardized current ranges.

In each of the embodiments of FIGS. 2 to 5, a supply voltage is delivered to the devices in lines 23', 23'', 23''', and 23'''', respectively, through power lines 29', 29'', 29''' and 29'''', respectively. The power lines can be connected to a voltage regulator in a meter head corresponding to voltage regulator 11 (FIG. 1) at corresponding line 29 (FIG. 1), for example.

Figure 6:
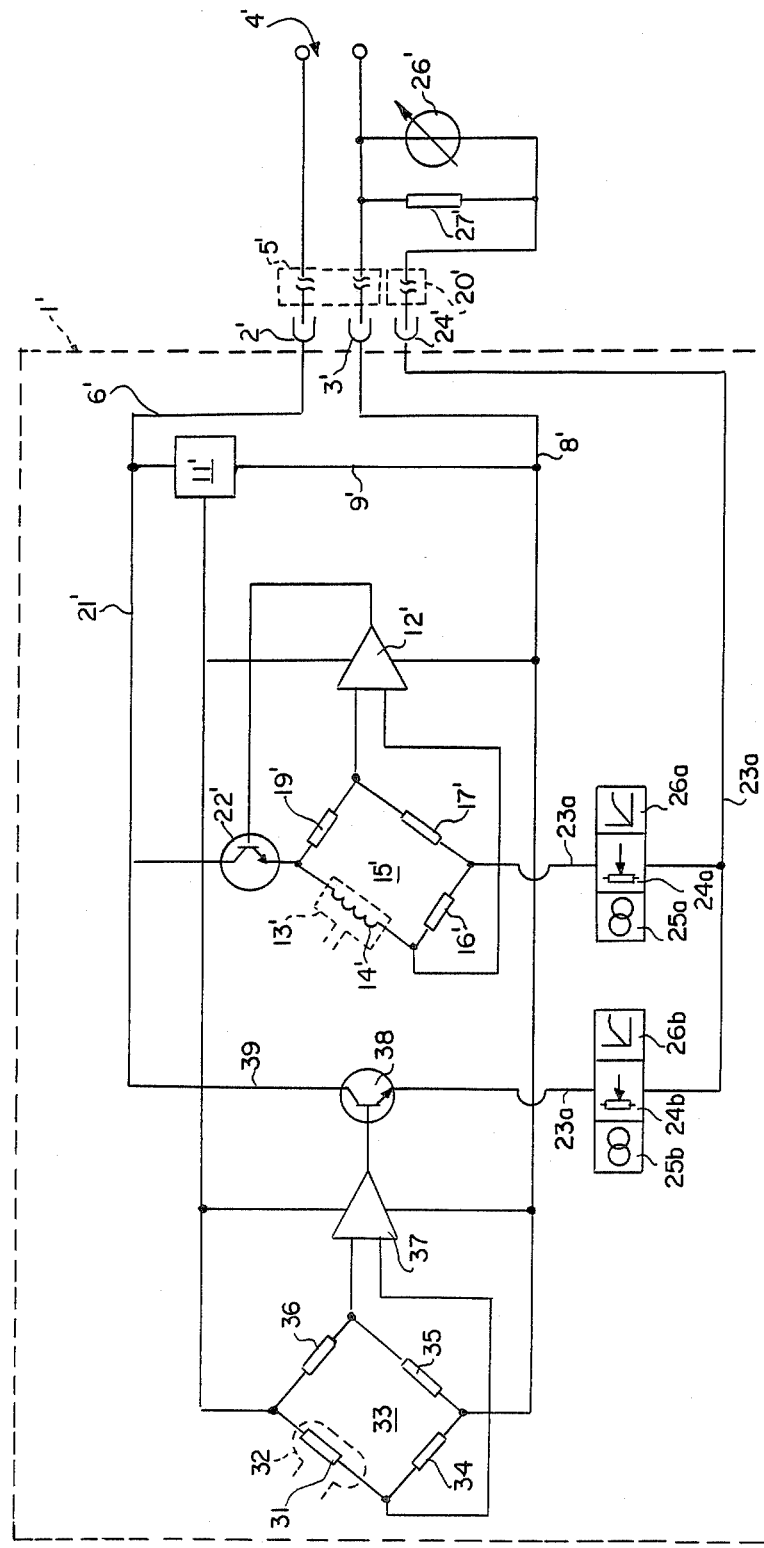
FIG. 6 is a schematic of still another preferred embodiment, a meter head, together with a portion of a control unit therefor.

FIG. 6 shows an embodiment in which two different measurement pickups are disposed in a single meter head at 1'. One measurement pickup is arranged from meter wire 14' in the manner already described with reference to FIG. 1 to form a controlled Pirani vacuum guage. The other measurement pickup has a piezo-resistive device arranged in a meter tube 32 for electrical response the pressure in a vessel in which the pressure is to be measured or monitored also connected to the meter tube 32. A vacuum guage operating on this principle is especially suitable for a pressure range adjoiningly above the high-pressure limit of the range of a the Pirani vacuum gauge. The result is, therefore, a combination pressure-pickup meter head which is suitable for a pressure range of from about 0.001 millibar to atmospheric pressure or higher.

The piezo-resistive device 31 is electrically disposed in a bridge 33 with additional resistances 34, 35 and 36. A voltage, regulated by the voltage regulator 11', is applied to two diagonally opposite points of the bridge 33. The other two, diagonally-opposite points of the bridge 33 are connected to the inputs of an amplifier 37. The amplifier 37 is connected to control a transistor 38 which is series inserted into a lead 39 which is an extension of lead 21'. This lead 39, therefore, also connects lead 21 to the separate signal-current lead 23a.

Unbalancing the bridge 33 thus produces a change of the measurement current flowing in lead 39 and thus also in lead 23a. In the lead 23a, the measurement currents of the two bridges 15', 33 are additive, each as adjusted by devices as described with reference to FIG. 4. Because the measurement current delivered by the piezo-resistive measurement-pickup device 31 varies only in a relatively-high pressure range (from about 100 to about 1000 mbar or higher, for example) and the measurement current delivered by the meter wire 14' varies only in an adjoiningly-lower pressure range (from about 0.001 to about 100 mbar, for example), however, it is possible by the addition of the measurement currents to cover the desired wide range of measurement.

The measurement pickups 14 and 31 are contained in separate meter tubes 13' and 32 in the embodiment of FIG. 6. It is possible, in another embodiment, however to put both pickups in only one measurement tube.

Figure 7:
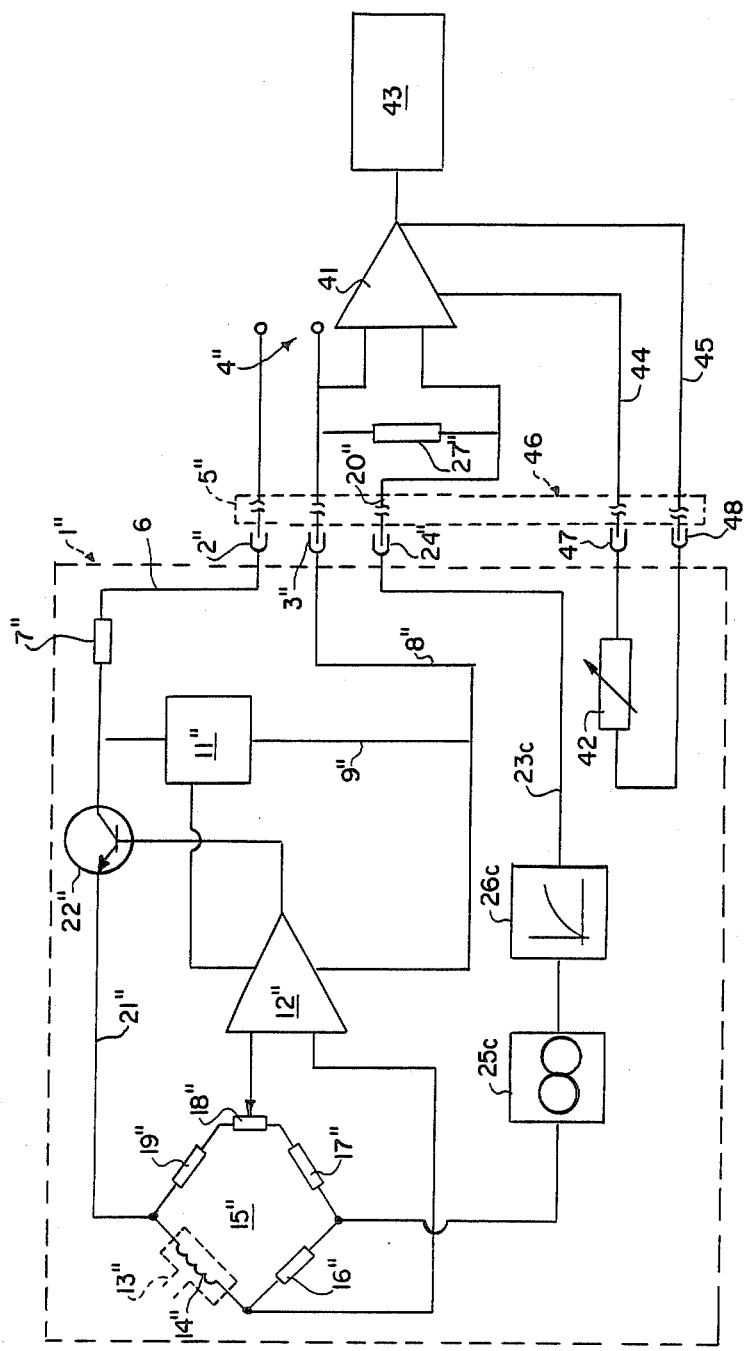
FIG. 7 is a schematic of still another preferred embodiment, a meter head, together with a portion of a control unit therefor.

In the embodiment according to FIG. 7, the voltage drop across the resistor 27'' is put into an amplifier 41. The gain of the amplifier 41 can be changed by a variable resistor 42. The gain-controlled, amplified signal from amplifier 41 is fed to a display unit 43.

It is especially desirable for the variable resistor 42 to be in the meter head at 1'', as shown. With this arrangement, the balancing resistor 24 (of FIGS. 2 to 4) can be omitted. For each zero point of the pressure display, the balancing can be, instead, performed in the meter head at 1'' by the resistor 42. This arrangement requires two additional leads 44 and 45 between the display and meter head, however. These are connected to the meter head at 1'' through terminals 47 and 48 of the meter head. Needless to say, all the leads (5', 20' 44 and 45) to the meter head can be combined in a single multi-conductor cable at 46, as shown.

It will be appreciated that the instant specification and claims are set forth by way of illustration and not of limitation, and that various changes and modifications may be made without departing from the spirit and scope of the present invention.

What is claimed is:

1. A conduction-responsive meter head, comprising:
   a device having electrical conduction responsive to a condition to be metered and means for communication with the condition, whereby to provide such electrical-conduction response;
   a bridge electrically including the device;
   power supply means comprising two terminals for providing electrical power to the bridge;
   measurement signal comprising a third terminal and a lead connecting the third terminal to the bridge for providing a measurement signal from the bridge to the third terminal; and
   a current transformer series-inserted in the lead.

2. The meter head of claim 1, and further comprising an amplifier series-inserted in the lead for varying the measurement signal provided thereby from the bridge to the third terminal in a characteristic way.

3. A conduction-responsive meter head, comprising:
   a device having electrical conduction responsive to a condition to be metered and means for communication with the condition, whereby to provide such electrical-conduction response;
   a bridge electrically including the device;
   power supply means comprising two terminals for providing electrical power to the bridge;
   measurement signal means comprising a third terminal and a lead connecting the third terminal to the bridge for providing a measurement signal from the bridge to the third terminal;
   a balancing resistor in the bridge and a balancing resistor series-inserted in the lead; and
   a current transformer series-inserted in the lead.

4. The meter head of claim 3, and further comprising an amplifier series-inserted in the lead for varying the measurement signal provided thereby from the bridge to the third terminal in a characteristic way.

5. A conduction-responsive meter head, comprising:
   a device having electrical conduction responsive to a condition to be metered and means for communication with the condition, whereby to provide such electrical-conduction response;
   a bridge electrically including the device;
   power supply means comprising two terminals for providing electrical power to the bridge;
   measurement signal means comprising a third terminal and a lead connecting the third terminal to the bridge for providing a measurement signal from the bridge to the third terminal; and
   a second device having electrical conduction responsive to the condition to be metered and means for communication with the condition, whereby to provide such electrical-conduction response; and a second bridge electrically including the second device; and
   the power supply means being also for providing electrical power to the second bridge; and
   the lead of the measurement signal means also connecting the third terminal to the second bridge for providing a combined measurement signal from both of the bridges to the third terminal.

6. The meter head of claim 5, wherein one device is a temperature-dependent resistor and the other device is a piezo-relative device.

7. A conduction-responsive meter head, comprising:
   a device having electrical conduction responsive to a condition to be metered and means for communication with the condition, whereby to provide such electrical-conduction response;
   a bridge electrically including the device;
   power supply means comprising two terminals for providing electrical power to the bridge;
   measurement signal means comprising a third terminal and a lead connecting the third terminal to the bridge for providing a measurement signal from the bridge to the third terminal; and
   two further terminals and a variable resistor connected across the terminals for equalizing a display of the measurement signal when the display is connected to the terminals.

* * * * *

UNITED STATES PATENT AND TRADEMARK OFFICE
CERTIFICATE OF CORRECTION

PATENT NO. : 4,729,242

DATED : March 8, 1988

INVENTOR(S) : Gunter Reich, et al.

It is certified that error appears in the above-identified patent and that said Letters Patent is hereby corrected as shown below:

Column 3, line 54 for "23''''" (first occurrence)

read -- 23''' --.

Column 6, line 24 for "piezo-relative" read

-- piezo-resistive --.

Signed and Sealed this

Thirteenth Day of June, 1989

Attest:

DONALD J. QUIGG

Attesting Officer

Commissioner of Patents and Trademarks